United States Patent [19]

Montagna et al.

[11] 4,330,090

[45] May 18, 1982

[54] METHOD FOR WROUGHT AND CAST ALUMINUM SEPARATION

[75] Inventors: Dominic Montagna, Baltimore; Harry V. Makar, Ellicott City, both of Md.

[73] Assignee: The United States of America as represented by the Secretary of the Interior, Washington, D.C.

[21] Appl. No.: 140,380

[22] Filed: Apr. 14, 1980

[51] Int. Cl.³ .............................................. B02C 19/12
[52] U.S. Cl. ....................................... 241/14; 241/23; 241/24
[58] Field of Search ............. 241/14, 23, 24, DIG. 38, 241/65, 27, 79.1, 79; 209/11, 3; 148/11.5 A

[56] References Cited

U.S. PATENT DOCUMENTS 3,666,442  5/1972  Layre et al. ....................... 241/14 X
3,894,693  7/1975  Takashima ............................ 241/14
4,251,034  2/1981  Corr et al. ............................. 241/14

OTHER PUBLICATIONS

Singer and Cottrell *Journal of the Institute of Metals*, vol. 73, 1947 pp. 33-54.

*Primary Examiner*—Mark Rosenbaum
*Assistant Examiner*—Timothy V. Eley
*Attorney, Agent, or Firm*—William S. Brown; Donald A. Gardiner

[57] ABSTRACT

A method of separating wrought and cast aluminum from a scrap mixture containing the two is disclosed. In this method, the scrap mixture is first heated to a temperature above the solidus temperature of the cast aluminum scrap. At this temperature, the scrap mixture is crushed thereby causing the cast aluminum to fragmentize into small pieces while merely causing flattening of the wrought aluminum. By using an appropriately sized screen, the cast aluminum fragments can then be separated from the wrought aluminum.

3 Claims, No Drawings

METHOD FOR WROUGHT AND CAST ALUMINUM SEPARATION

FIELD OF THE INVENTION

This invention relates generally to a method for recovering scrap metals and more particularly to a method of separating wrought and cast aluminum from a mixture containing the two.

BACKGROUND OF THE INVENTION

The recovery of various metals from scrap material has become increasingly important in light of the growing scarcity of primary raw materials and their increasing cost. In addition, recycling also helps to reduce ecological trauma. Various methods have been developed to recover various metals from different mixtures. For example, in U.S. Pat. No. 3,666,442 to Layne et al, a method of obtaining a beryllium enriched material by comminuting an aluminum-beryllium alloy is disclosed. In this method, the comminuted alloy produces a coarse particulate fraction of an aluminum-beryllium eutectic composition and a fine particulate fraction of beryllium which is then easily separated out by screening. Another method, used for separating zinc and aluminum from iron and copper based alloys, is disclosed in U.S. Pat. No. 3,605,243 to Oster. In this method, the scrap mixture is first rolled to reduce the size of the particles and then tumbled. The tumbling causes the zinc and aluminum to break away from the iron and copper alloys from which it can be separated easily.

There has also been disclosed in the prior art methods for embrittling scrap material so that it can be easily separated. For example, in U.S. Pat. No. 3,885,744 to Drage, a method for freezing scrap at cryogenic temperatures is disclosed in which the frozen scrap is then crushed to a smaller size amenable to magnetic and gravity separation. Also disclosed in U.S. Pat. No. 4,123,294 to Hanink is a method of separating ferritic steel and ductile iron from other valuable metals by carburizing the scrap to embrittle the iron and steel. The scrap is then pulverized to reduce the iron and steel to a powder which is easily removed by screening.

In the secondary aluminum industry there exists a significant volume of aluminum scrap containing both wrought aluminum and cast aluminum. Such mixed scrap comes from various sources such as junked automobiles, urban waste and scrap appliances. Generally, wrought aluminum is fairly pure aluminum while cast aluminum has a high silicon content. In many instances it is desirable that wrought and cast aluminum be separated from each other.

A number of possible methods for separating cast and wrought aluminum have been considered and tested by applicants. These methods included eddy current techniques, chemical spotting for subsequent color sorting, and reshredding and screening. However, the results of these considerations and tests indicate that these methods apparently have little or no beneficial effects in separating cast and wrought aluminum.

SUMMARY OF THE PRESENT INVENTION

In accordance with the present invention, a method is provided for separating wrought and cast aluminum from a scrap mixture containing the two. The separation of the two types of aluminum is achieved by first heating the mixture to a temperature above the solidus temperature of the cast aluminum, preferably in the range of 550° C. to 580° C. At this temperature, the mixture is crushed causing the cast aluminum to become fragmentized into small pieces and the wrought aluminum to be flattened. After crushing, the fragmentized pieces of cast aluminum are then easily separated from the flattened pieces of wrought aluminum by an appropriately sized screen. If magnetic particles are trapped with the scrap mixture, these magnetic particles are readily separated magnetically from the mixture after the crushing operation.

Among other advantages of the present invention is that the method is nondissipative, that is, the method provides recovery of all constituents found in the material handled. Further, the method of separation does not require the addition of salt, chemicals or a catalyst to achieve the separation. The invention also enables the separation of metallics from nonmetallics, as well as the separation of specific metallics, e.g., the separation of magnetic and nonmagnetic metallic materials.

Other features and advantages of the present invention are stated in or apparent from the detailed description of a presently preferred embodiment of the invention found hereinbelow.

DETAILED DESCRIPTION OF THE PREFERRED EMBODIMENT

It is reported in *Materials Engineering*, Mid-Nov. 1976, pages 63-72, that the Brinell hardness, measured on a 500 kg load, is between 40 and 145 kg/sq. mm for cast aluminum alloys depending on the quantity of silicon present. On the other hand, the Brinell hardness for wrought alloys has been found to be between 19 and 30 kg/sq. mm. These hardness values refer to alloys which are specifically used by the automotive industry and are present in scrap generated by an auto shredder. This difference in Brinell hardness between wrought and cast alloys of aluminum prompted applicants to attempt to crush an alloy mixture to effect separation. However, when crushing of the alloy was attempted at room temperature the cast aluminum alloys did not break up as expected. The present invention makes use of the dissimilar physical properties in strength and hot ductility of cast aluminum in comparison to wrought aluminum. As reported by Singer and Cottrell in the *Journal of the Institute of Metals*, volume 73, 1947 at pages 33-54, the aluminum alloys containing more than approximately 1.5 percent silicon lose their resistance to fracture when heated to approximately 580° C. The hot ductility of these high silicon alloys, as indicated by reduction of area and elongation values, decreases to zero at or near this temperature. On the other hand, high purity (99.5 percent) aluminum retains its hot ductility with reduction of area and elongation values of 64 and 40 percent, respectively, at this temperature level.

The preferred method of separating wrought and cast aluminum according to the present invention is as follows. The mixed aluminum scrap is first heated to a temperature near or above the solidus temperature of the aluminum-silicon alloys of cast aluminum. For this purpose, a temperature in the range of approximately 550° C. to 580° C. is preferred. While the mixed scrap is maintained at a temperature within this temperature range, the scrap is placed into an impact apparatus and hot crushed. The impact apparatus causes the cast aluminum to fragmentize into small pieces due to its almost negligible tensile strength and hot ductility. On the other hand, the wrought aluminum is only flattened by this same apparatus because it maintains some tensile strength and ductility. The resultant mixture therefore contains small pieces of cast aluminum and larger flattened pieces of wrought aluminum. The cast aluminum is then easily separated from the wrought aluminum by an appropriately sized screen or like device.

It is quite likely that any mixture of scrap aluminum will also contain some trapped magnetic materials as well. The mixture of the scrap aluminum and magnetic materials can be subjected to the same hot crushing operation and then the separated magnetic particles can be easily removed magnetically from the aluminum after the hot crushing step. If other metallic and nonmetallic materials, such as stainless steels, rocks and ceramic products, are trapped in the mixture of scrap aluminum, these other materials are also separated from the scrap aluminum after the hot crushing step and can then be removed.

The method of the present invention has been tried experimentally on a small scale by the applicants. First several pieces of cast aluminum alloys and wrought aluminum alloys recovered from auto shredder scrap were simultaneously heated in a graphite crucible in a pot furnace to between 550° C. and 580° C. After being held at this temperature for one hour, the entire charge was hot crushed through a jaw-crusher apparatus with a one-half inch clearance between the impact surfaces. The results showed that the fragmentized cast aluminum can be easily separated from the flattened wrought aluminum by the use of an appropriately sized screen.

Although the invention has been described in detail with respect to an exemplary embodiment thereof, it will be understood by those of ordinary skill in the art that variations and modifications can be effected within the scope and spirit of the invention.

We claim:

1. A method of separately recovering wrought aluminum and cast aluminum from a scrap mixture of the two comprising the steps of:

heating the scrap mixture to a temperature near the solidus temperature of the cast aluminum scrap;

hot crushing the heated scrap in an impact apparatus so that the cast aluminum is fragmentized while the wrought aluminum is flattened; and separating the two types of aluminum by screening.

2. A method as claimed in claim 1, wherein the scrap mixture is heated to a temperature between approximately 550° C. and 580° C.

3. A method as claimed in claim 1 wherein the scrap mixture also includes magnetic particles, said method further including the step of magnetically separating the magnetic particles from the scrap mixture after the mixture has been crushed but before the mixture is screened.

* * * * *